United States Patent [19]
Chadwick et al.

[11] Patent Number: 5,956,849
[45] Date of Patent: Sep. 28, 1999

[54] LUBRICATING SHAVING AID

[75] Inventors: Barry W. Chadwick; Aiying Wang, both of Simpsonville; Kathryn Bradanini, Taylors, all of S.C.

[73] Assignee: Bic Corporation, Milford, Conn.

[21] Appl. No.: 08/869,396

[22] Filed: Jun. 5, 1997

[51] Int. Cl.⁶ ...................................................... B26B 21/44
[52] U.S. Cl. ................................................... 30/41; 30/50
[58] Field of Search ............................ 30/41, 50; 424/73

[56] References Cited

U.S. PATENT DOCUMENTS

| | | | |
|---|---|---|---|
| 4,170,821 | 10/1979 | Booth | 30/41 |
| 4,872,263 | 10/1989 | Etheredge, III | 30/41 |
| 4,875,287 | 10/1989 | Creasy et al. | 30/41 |
| 5,005,287 | 4/1991 | Ritter | 30/41 |
| 5,056,221 | 10/1991 | Thoene | 30/41 |
| 5,345,680 | 9/1994 | Vreeland et al. | 30/41 |
| 5,454,164 | 10/1995 | Yin et al. | 30/41 |
| 5,551,152 | 9/1996 | Tseng | 30/41 |
| 5,626,154 | 5/1997 | Rogers et al. | 30/41 |
| 5,711,076 | 1/1998 | Yin et al. | 30/41 |
| 5,781,997 | 7/1998 | Ferraro et al. | 30/47 |

*Primary Examiner*—Hwei-Siu Payer
*Attorney, Agent, or Firm*—Pennie & Edmonds LLP

[57] ABSTRACT

The present invention is directed to a lubricating shaving aid on a shaving razor or a shaving cartridge to reduce frictional drag between a razor blade edge and a shaver's skin and to provide a lubricating film on the shaver's skin during wet shaving. The lubricating shaving aid comprises a water soluble polyacrylamide and a water insoluble polyurethane. The invention further discloses a method for making the same.

19 Claims, 2 Drawing Sheets

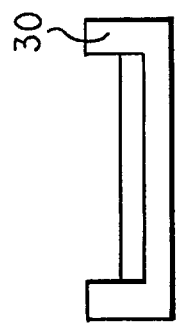
FIG. 8
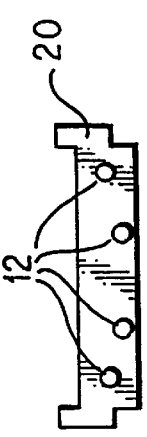
FIG. 9
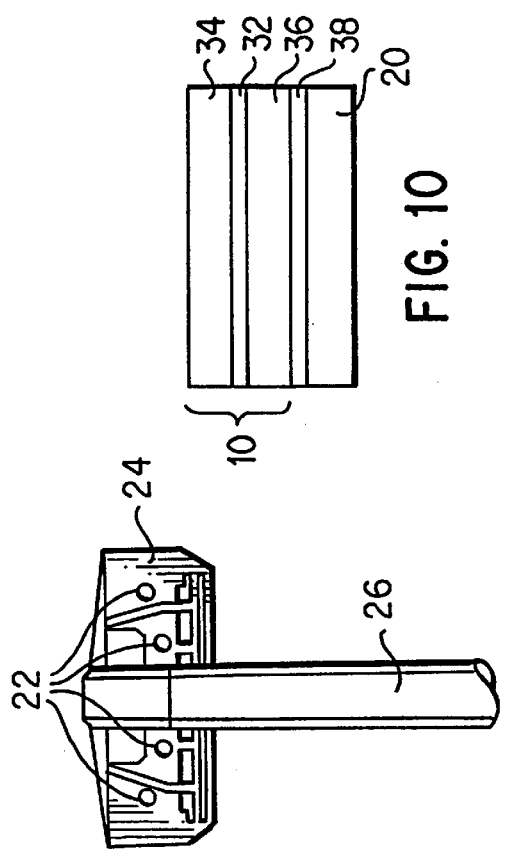
FIG. 10
FIG. 3
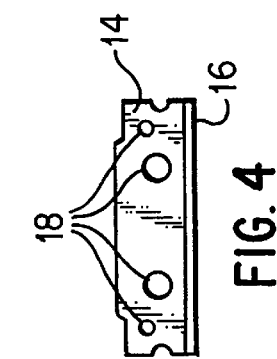
FIG. 7
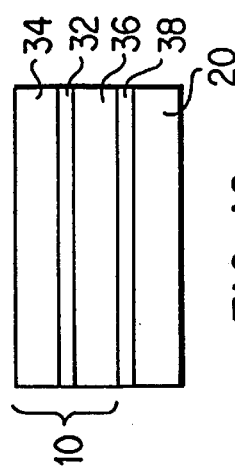
FIG. 2
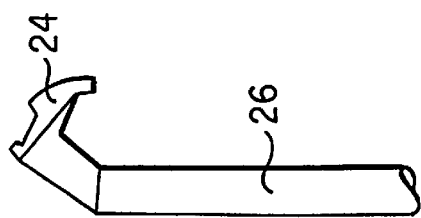
FIG. 6
FIG. 4
FIG. 1
FIG. 5

LUBRICATING SHAVING AID

FIELD OF THE INVENTION

The present invention relates to a lubricating shaving aid for use with a wet shaver for improving the ease with which a shaving razor or a shaving cartridge can be drawn across the skin during shaving. More particularly, the invention relates to a lubricating shaving aid with an improved service life and to a process for making the same.

BACKGROUND OF THE INVENTION

Two main types of shaving aids are known. The first type is water insoluble shaving aids and the second type is water soluble lubricating shaving aids. The water insoluble shaving aids are designed to become slippery when wet without depositing a film on the shaver's skin during wet shaving. On the other hand, the water soluble lubricating shaving aids are designed to deposit a lubricating film on the shaver's skin during wet shaving. Most lubricating shaving aids contain a water soluble component dispersed in a water insoluble matrix.

As used herein, the term "service-life" applies to a lubricating type composite matrix containing at least a water soluble component therein. The term "service-life" refers to the amount of time, sometimes provided as the number of shaves, required to substantially deplete the lubricating water soluble component of the shaving aid from the water insoluble matrix during wet shaving. Substantial depletion of the water soluble component of the shaving aid typically exposes the rough water insoluble matrix and further causes the surface of the shaving aid to become both irregular and rough, thereby, increasing its coefficient of friction when drawn over a shaver's skin, thus, presenting a source of skin irritation during wet shaving.

In wet-shaving razor systems, there are several factors which can contribute to discomfort during shaving. Such factors include, but are not limited to, excessive frictional drag of the razor across the skin, the force needed to cut the hair which depends on, among other things, the mechanical strength of the hair protein structure and degree of clogging of the razor parts with whisker, skin and other debris. Other detracting factors include various skin conditions such as eczema, psoriasis, other rashes, erythema (redness), acne, other skin eruptions and previously inflicted nicks and cuts.

Efforts to remedy at least some of these noted problems have included the use of pre-shave and after-shave lotions, special whisker-softening lathers or agents, blood coagulants and other medicinal or soothing bio-effecting agents. Various agents, namely, shaving foams, shaving soaps, stubble softening agents as well as medicinal or cosmetic substances or combinations of all these have been used. Such shaving agents reduce either the cutting work which has to be done to separate the stubble by softening the stubble or act as a lubricant which reduces the frictional force between the various parts of the shaving razor in contact with the shaver's skin. Even though shaving comfort can, to some degree, be enhanced by the use of one or more of the above-mentioned agents, the requirement that they be applied before or after shaving (because of loss due to evaporation or repeated shaving strokes) lessens their effectiveness.

In view of these problems, it is believed that a shaving aid integrally included with or attached to the shaving instrument itself will provide improved shaving features. For example, lubricating shaving aids integrated with or attached to the shaving instrument itself will substantially reduce the frictional drag of the razor blade(s) as the razor is drawn across the shaver's skin. Frictional drag is substantially reduced by simultaneously lubricating the skin during the act of wet shaving.

It was proposed to fit a strip of water insoluble polystyrene and a water soluble lubricant such as polyethylene oxide in a recess on the cap of a razor. The endeavor was to continuously dissolve out the water soluble polymer components during the course of the wet shave and to produce a lubricating film on the skin. This was expected to reduce friction between the skin and the shaving razor during shaving and to make shaving softer and more comfortable.

To that end, U.S. Pat. No. 4,170,821 to Booth discloses a lubricating shaving aid (attached to a disposable razor blade cartridge) which dissolves out a water soluble lubricant during the act of wet shaving. The lubricant, as part of the shaving aid, was incorporated into a matrix of water insoluble polystyrene. According to Booth, the shaving aid can contain a water soluble lubricating oil such as microencapsulated silicone oil; water soluble polyethylene oxide; non-ionic polyacrylamide; and/or a natural polysaccharide derived from plant materials, e.g., guar gum; a depilatory agent; a medicinal agent for killing bacteria or repairing skin condition; a cosmetic agent for softening the skin; or a blood coagulant.

However, there are some disadvantages recognized in the art to using shaving aids such as those described by Booth '821. The water soluble lubricant dissolves or leaches out of the water insoluble matrix during wet shaving, leaving behind the depleted water insoluble matrix. Typically, when the water soluble component of the shaving aid is nearly depleted, the lubricating shaving aid is at the end of its service life. It has been reported in U.S. Pat. No. 4,872,263 to Ethredge, III, that the shaving aid of Booth suffers from certain disadvantages including a service-life lasting on the average of three shaves. Thereafter, its surface becomes irregular and rough and its coefficient of friction increases, contributing to further skin irritation with continued use. At this stage, only a slight amount of lubricant may be provided, if any, by the shaving aid. It is at this point, when the cutting action and shaving comfort of the razor blade have deteriorated through wear that the additional lubricant effect is needed. However, due to the Booth shaving aid's relative short service life, an adequate quantity of lubricant is no longer available.

As opposed to lubricating shaving aids, water insoluble xerogels of polyvinyl pyrrolidone and polyurethane were developed as disclosed, for example, in U.S. Pat. No. 5,056,221 to Theone. Upon exposure to water during wet shaving, xerogels swell into lyogels which are more slidable on the shaver's skin than in their dry xerogel state. The colloidal substance forming the lyogel does not, however, pass into solution, and consequently, does not provide a lubricating film on the shaver's skin during wet shaving. Other water insoluble shaving aids include hydrogels (e.g., polyvinyl pyrrolidone/polyurethane hydrogels of U.S. Pat. No. 4,875,287 to Creasy et al.), interpolymers (e.g., polyvinyl pyrrolidone/polyurethane interpolymers of U.S. Pat. No. 5,005,287 to Riter) and the like.

Though lubricant depletion is not encountered with water insoluble shaving aids, it is preferred to provide a lubricating shaving aid for greater shaving comfort. It is further preferred to provide a shaving aid having a slow dissolution rate for increasing the shaving aid's service life and for greater wet shaving comfort. Slow dissolution rates prolong the service life of the lubricating shaving aid and delay the leaching out of all (or nearly all) of the shaving aid lubricant.

It is further desirable to provide a lubricating shaving aid that deposits a film of both the water soluble polymer component thereof and the water insoluble polymer component thereof on a shaver's skin during wet shaving for greater shaving comfort and to provide a method for making the same.

It is additionally desirable to provide a lubricating shaving aid that deposits a film of both the water soluble polymer component thereof and the water insoluble component thereof wherein the latter component is gradually and uniformly released without imparting a rough surface to the shaving aid, thereby maintaining a low coefficient of friction and a smooth profile.

SUMMARY OF THE INVENTION

These and other objects are accomplished by a lubricating shaving aid provided on a shaving razor or on a shaving cartridge. The shaving aid according to the present invention is affixed to a shaving cartridge or a shaving razor containing one or more shaving blades. Upon wetting and stroking of the razor blade cutting edge(s) across the skin, the shaving aid comes in contact with the shaver's skin, thereby, lubricating the skin over the affected area.

According to the present invention, the shaving aid is provided as a solid dispersion. The shaving aid comprises a dispersion of polyacrylamide and polyurethane. During shaving, the shaving aid releases a lubricating film of the dispersion on the shaver's skin when wet. Alternatively stated, both the polyacrylamide and the polyurethane components of the solid dispersion are deposited as a lubricating film on the shaver's skin during wet shaving for greater shaving comfort. Thus, the shaving aid of the present invention provides greater lubricating properties, a smoother profile, a longer service-life and a lower coefficient of friction than do other lubricating shaving aids known in the art.

The shaving aid is made by a process comprising immersing, for example, a thermoplastic material (e.g., polyester, polystyrene, acrylonitrile butadiene styrene, etc.) in an aqueous bath comprising polyacrylamide and polyurethane. After immersion of the thermoplastic material in the bath for a sufficient time, a slurry layer of the shaving aid is deposited thereon. The slurry layer is then dried. Thereafter, the thermoplastic material, containing a dried shaving aid layer deposited thereon, is affixed onto a shaving razor component or a shaving cartridge component. Methods for affixing the thermoplastic material include ultrasonic welding, interposing an adhesive layer, etc.

Details of the invention will become readily apparent from the following description when taken in conjunction with the accompanying drawings.

BRIEF DESCRIPTION OF THE DRAWINGS

FIG. 1 is a side-view of a cap portion of an exemplary shaving unit;

FIG. 2 is a top-view of the cap portion depicted in FIG. 1;

FIG. 3. is a bottom view of the cap portion depicted in FIGS. 1 and 2;

FIG. 4 is a top view of an exemplary razor blade of an exemplary shaving unit;

FIG. 5 is a side-view of an exemplary shaving unit platform attached to a handle for accepting the razor of FIG. 4 and the cap portion of FIGS. 1, 2 and 3;

FIG. 6 is a top-view of the shaving unit platform of FIG. 5;

FIG. 7 is a bottom-view of the shaving unit platform of FIGS. 5 and 6;

FIG. 8 is a side-view of an exemplary safety closure for attaching to an exemplary assembled shaving razor;

FIG. 9 is a top-view of the safety closure of FIG. 8;

FIG. 10 is an exemplary cross-sectional view of cap 20 depicting shaving aid 10 indirectly attached to cap 20 using an adhesive layer 10c.

DETAILED DESCRIPTION OF THE PREFERRED EMBODIMENTS

Figure 11:
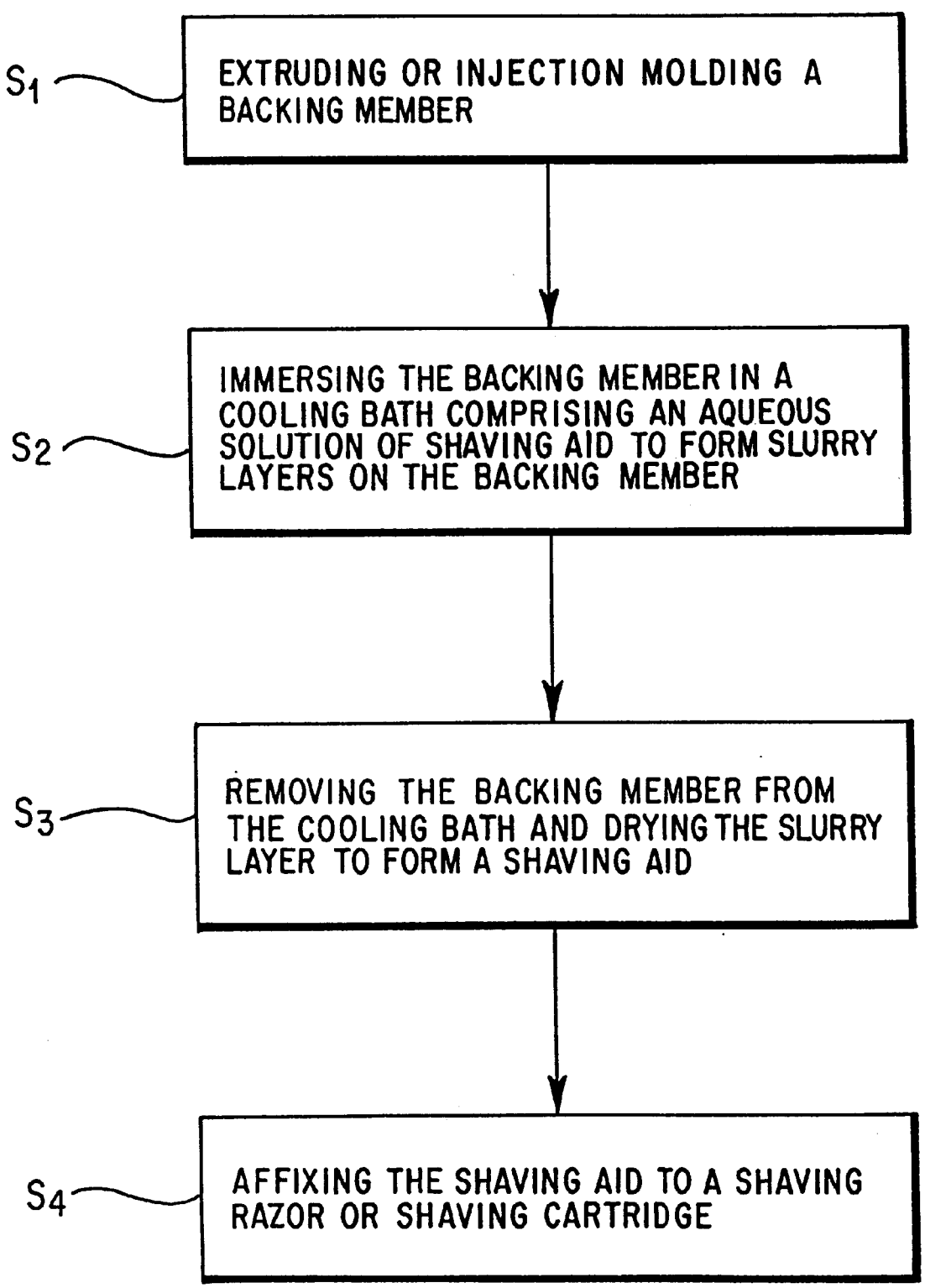
FIG. 11 is a flow chart outlining an exemplary process for making the lubricating shaving aid of the presently claimed invention.

One example of a shaving razor provided with a lubricating shaving aid is described below with reference to FIGS. 1–10. The exemplary shaving razor is assembled by fitting together the cap 20, the razor blade 14 and the platform 24 (see FIGS. 2, 4 and 6). Each of these components are fitted together by placing the razor blade 14 on the platform 24, then placing the cap 20 over the razor blade 14 with the cap legs 12 aligned to fit through razor blade holes 18 and platform holes 22. During storage, to fit snugly in juxtaposition thereon, the safety closure 30 may be fitted over the shaving razor head composed by assembling platform 24, razor blade 14 and cap 20 as described. Further, even though the handle 26 is depicted as being permanently attached to platform 22, the platform 22, the razor blade 14 (or a plurality of razor blades—not shown) and cap 20 with lubricating shaving aid 10 may form a disposable shaving cartridge that can be replaced with a new cartridge on handle 26 when necessary.

The present invention provides a lubricating shaving aid 10 normally disposed on a top surface of cap 20 as shown in FIG. 1. The shaving aid of the present invention comprises a dispersion of at least one water soluble polymeric component such as polyacrylamide and a water insoluble component such as polyurethane.

FIG. 11 outlines exemplary process steps for forming the shaving aid made according to the present invention. As noted in FIG. 11, step $S_1$ is directed to provide a backing 32 made from a thermoplastic material (or a substitute material) in a desired shape such as a sheet, a strip or the like having a desired thickness, preferably, from about 0.1 mm to about 0.5 mm. However, other thicknesses may be used. The thermoplastic material is preferably heat extruded. However, any suitable method recognized in the art such as injection molding for providing a thermoplastic backing of the desired shape and thickness may be used. Examples of such thermoplastic materials suitable for use with the shaving aid of the present invention include, but are not limited to, polyesters, polystyrenes, acrylonitrile butadiene styrenes, nylons or other extrudable or injection moldable thermoplastics. Further, while a thermoplastic material is preferred, any suitable material such as a metal, preferably, a porous metal layer, a rubber, a variety of other polymers or the like may be used in place of the thermoplastic which is capable of physically or chemically bonding to the slurry layer of polyacrylamide and polyurethane as, for example, referenced in step $S_2$ of FIG. 11.

In step $S_2$, the warm extruded thermoplastic backing 32 therefor is immersed in a cooling bath comprising an aqueous solution of the shaving aid at a bath temperature, preferably, about 40° F., for a time, preferably, from about 2 to about 5 minutes, sufficient to cool the extruded backing member 32 and to form slurry layers of shaving aid 34 and 36 having a slurry thickness on backing 32, preferably, from about 20 to about 100 mil thereon.

According to one embodiment of the present invention, the aqueous solution of a water insoluble polyurethane and a water soluble polyacrylamide in the cooling bath is applied to the surfaces of the extruded backing 32 (see FIG. 10).

Further, a blowing agent may be added to the thermoplastic material, preferably, during extrusion or during injection molding of backing member 32. The blowing agent provides a more porous, sponge-like structure to the thermoplastic material or the intermediate layer. In effect, the blowing agent imparts greater surface area to the thermoplastic backing member for greater absorption and/or adsorption of the polyacrylamide and polyurethane lubricating shaving aid slurry layer during immersion in the cooling bath.

Thereafter, in accordance with step $S_3$ of FIG. 11, the slurry coating layer is dried to form the shaving aid of the present invention (e.g., layers 34 and 36 of FIG. 10).

In one embodiment of the present invention, a preferred polyester sheet is provided. The polyester sheet is immersed and passed through the cooling bath comprising polyacrylamide, polyurethane, optional minor additives and water in order to form a shaving aid slurry layer on all exposed surfaces thereof. Thereafter, further according to step $S_3$, the polyacrylamide and polyurethane slurry layer deposited on the polyester sheet is dried. Drying is accomplished by means such as oven baking, air curing or ultraviolet curing. In another embodiment, cap member 20 may be immersed in the cooling bath to coat same with the shaving aid. The coated cap member 20 then can be assembled to form a shaving cartridge.

It should be noted that when wet, the ratio (w/w) of polyacrylamide to polyurethane in the shaving aid of the present invention preferably varies from about 1:1 to about 1.2:1. After drying, sheet 10b may be cut to the appropriate size and shape for application to a shaving razor or shaving cartridge component, as in step $S_4$. As an example, a self-adhesive coating layer 38 is applied to the bottom surface of layer 36 and to cap portion 20 as depicted in FIG. 10. Attachment of shaving aid 10 (as in FIG. 10) to cap 20 is accomplished by peeling away the self-adhesive backing (not shown) from adhesive layer 38 and affixing the shaving aid 10 to the cap 20 as shown. A preferred adhesive is ethylene vinyl acetate.

The shaving aid 10 may be embedded, dispersed into, formed as an integral component of, or otherwise affixed to the shaving cartridge or the shaving razor structure adjacent the shaving edge(s) 16 of single or multiple blades supported therein. If an adhesive layer is not used, other affixing techniques for example, spot welding, ultrasonic welding, using an adhesive, heat sealing, or any of the other methods known in the art for joining layers can be used. The method of affixing should at least be sufficient to maintain adhesion of the shaving aid to the razor cap or other component of the razor for the duration of the shaving aid's service life or at least while the razor is being used under wet shaving conditions.

Unless specifically indicated otherwise, all percents by weight noted herein indicate the percent by weight of a given component based on the total weight of the cooling bath. The cooling bath, preferably, comprises an aqueous solution of polyacrylamide (e.g., Alkapaste PC-1 from Rhone-Poulenc; or a copolymer of acrylamide with diallyldimethyl ammonium chloride containing 5.3% (w/w) solids based on the total weight of the polyacrylamide solution). The polyacrylamide solution is present in an amount from about 10% to about 60%, preferably, present in an amount of about 40%. The cooling bath further comprises polyurethane in aqueous dispersion (e.g., or an aqueous dispersion of polyurethane from about 33 to about 37% (w/w) and N-methyl-2-pyrrolidone present in an amount of about 12% and the remainder water based on the total weight of the polyurethane dispersion, Bayhydrol 123® or Bayhydrol 110® from Bayer) in an amount from about 10% to about 50%, preferably, present in an amount of about 30%. The remainder of the cooling bath is water, preferably, present in an amount of about 30%. The cooling bath may further contain minor additives in trace amounts (e.g., less than about 1%). Such additives include biocides, coloring agents and the like that are well known in the art.

It is believed, though not bound by theory, that the dispersed polyurethane present in the shaving aid of the present invention provides a physical barrier between the polyacrylamide and the water encountered during wet shaving. Thus, the dispersed polyurethane slows the dissolution of the polyacrylamide from the shaving aid and extends its service life. It is noted that both the dispersed polyurethane and the polyacrylamide of the shaving aid are deposited on the shaver's skin during wet shaving.

Further, it is believed that the polyurethane is itself gradually and uniformly released from the shaving aid during wet shaving. As the polyurethane particles are released, the underlying polyacrylamide is exposed to the water encountered during wet shaving. Exposure to the water and its inherent solubility therein allows the polyacrylamide to form a lubricating layer on the shaver's skin during wet shaving.

The gradual and uniform release of the polyurethane is in sharp contrast to that of polystyrene matrix lubricating shaving aids. Polystyrene matrix lubricating shaving aids become soft when wet and the polystyrene tends to form a rough irregularly shaped profile. In contrast, the polyurethane dispersed particles are gradually and uniformly released from the shaving aid of the present invention. This gradual and uniform release not only increases the service life of the presently claimed shaving aid, it also provides for a more comfortable and "smooth" surface profile which is repeatedly drawn across the shaver's skin during wet shaving.

Having described the invention, the following examples are provided to illustrate the best mode now known to practice the present invention. However, as will be readily understood by one of ordinary skill in the art, the examples are only illustrations of preferred embodiments of the present invention and are not intended to limit the scope of the present invention. As understood by one of ordinary skill, variations and modifications may be made within the scope of the present invention. The examples provided are provided for illustrative purposes only.

EXAMPLES

Example 1

A polyester strip (e.g., of extrudable thermoplastic material of 0.5 mm thickness) was immersed in a polyacrylamide/polyurethane cooling bath at 40° C. for 3–5 minutes to provide a 20–100 mil thick slurry layer. The shaving aid cooling bath was formed by mixing with a standard prop type mixer (Lightnin® Model V-12/110 volt/½ horsepower) the following composition:

| Component | Percent by Weight (w/w) |
| --- | --- |
| Alkapaste PC-1 (Rhone-Poulenc) (Copolymer of acrylamide with diallyldimethyl ammonium chloride at 5.3% solids) | 40% |
| Polyurethane dispersion (Bayer) (Bayhydrol 123 ®--aqueous dispersion of polyurethane with 33–37% solids, N-methyl-2-pyrrolidone 12%, water, remainder) | 30% |
| Water | 30% |
| Biocide (e.g., Germeben ®IIE -- based on the total weight of the biocide -- comprising 56% propylene glycol, 30% diazolidinyl urea, 11% methyl paraben, and 3% propyl paraben) | Trace (e.g., <1–5%) |
| Coloring material (e.g., cosmetic grade $TiO_2$) | Trace (e.g., <1%) |

Immersion in the cooling bath resulted in the formation of a 20–100 mil thick slurry layer. The slurry layer was then dried at about 60–100° C. for about 120 minutes in an oven. After drying, the slurry layer had a dry thickness of about 2–10 mils. The strip with a dried layer of polyacrylamide/polyurethane was then affixed to the cap 20 using ethyl vinyl acetate as an adhesive layer. This shaving aid provided reduced frictional drag and a longer shelf life than those of shaving aids previously known.

When the shaving aid (made according to the present example) was soaked in water at 60° C., the water soluble polyacrylamide was not depleted for at least 4 hours. In some cases, depletion of the polyacrylamide (from the shaving aid) required immersion in 60° C. water from about 4 to about 8 hours, a much longer time than required of previously known lubricating shaving aids. The depletion of the polyacrylamide after at least about 4 hours was evidenced by a noticeable increase in the frictional drag of the shaving aid across a shaver's skin during wet shaving.

What is claimed is:

1. A razor cartridge comprising:
   a blade seat;
   a razor blade;
   a cap; and
   a shaving aid affixed to said cartridge, said shaving aid formed by drying an aqueous dispersion of a water soluble component and a water insoluble component and comprising a structure in the form of a solid dispersion of said water insoluble component in said water soluble components;
   wherein said structure permits uniform release of said water insoluble component as said water soluble component dissolves upon exposure of said shaving aid to water.

2. The razor cartridge of claim 1, wherein said cartridge is a disposable cartridge and said water soluble component of said shaving aid is not depleted for at least 4 hours when immersed in water at about 60° C.

3. The razor cartridge of claim 2, wherein said water soluble component is polyacrylamide.

4. The razor cartridge of claim 3, wherein said water insoluble component is polyurethane.

5. The razor cartridge of claim 4, wherein a ratio of the polyacrylamide to the polyurethane is from about 1:1 to about 1.2:1 by weight when the shaving aid is wet, the shaving aid in dry film form having a 1:6 to 1:8 polyacrylamide:polyurethane weight ratio.

6. The razor cartridge of claim 5, wherein said shaving aid further comprises a biocide and a coloring agent.

7. The razor cartridge of claim 6, wherein said coloring agent is titanium dioxide.

8. The razor cartridge of claim 7, wherein said shaving aid has a dry film thickness from about 2 to about 10 mils.

9. The razor cartridge of claim 6, wherein said biocide and said coloring agent are present in a trace amount of up to about 1% by weight based on a total weight of said shaving aid.

10. The razor cartridge of claim 1, wherein said shaving aid further comprises at least one agent selected from the group consisting of a biocide, a coloring agent, and N-methyl-2-pyrrolidone.

11. The razor cartridge of claim 1, wherein said water insoluble component is uniformly dispersed in and released with said water soluble component and does not remain in a matrix form on said razor cartridge upon dissolution of said water soluble component.

12. The razor cartridge of claim 1, wherein said shaving aid of said razor cartridge is formed by depositing, on a material, said aqueous dispersion, drying said deposited aqueous dispersion to form said shaving aid, and coupling said material to said razor cartridge.

13. A shaving aid for a razor cartridge, said shaving aid formed by drying an aqueous dispersion of a water insoluble component in a water soluble component and comprising a structure in the form of a solid dispersion of said water insoluble component in said water soluble component, wherein the structure permits uniform release of said water insoluble component as said water soluble component dissolves upon exposure of said shaving aid to water.

14. The shaving aid of claim 13, wherein said water soluble component is polyacrylamide and said water insoluble component is polyurethane.

15. The shaving aid of claim 14, wherein a ratio of said polyacrylamide to said polyurethane is from about 1:1 to about 1.2:1 by weight when said shaving aid is wet, and said shaving aid in dry film form has a 1:6 to 1:8 polyacrylamide:polyurethane weight ratio.

16. The shaving aid of claim 23, wherein said shaving aid further includes at least one agent selected from the group consisting of a biocide, a coloring agent, and N-methyl-2-pyrrolidone.

17. A shaving aid for a razor cartridge, wherein said shaving aid comprises a structure in the form of a solid dispersion of a water insoluble component dispersed in a water soluble component, wherein said structure permits release of both said water soluble component and said water insoluble component upon exposure of said shaving aid to water to dissolve said water soluble component.

18. The shaving aid of claim 13, wherein said water insoluble component is uniformly dispersed in and released with said water soluble component and does not remain as a matrix upon exposure of said shaving aid to water to dissolve said water soluble component.

19. The shaving aid of claim 13, wherein said water soluble component and said water insoluble component are polymers.

* * * * *

UNITED STATES PATENT AND TRADEMARK OFFICE
CERTIFICATE OF CORRECTION

PATENT NO.    : 5,956,849
DATED         : September 28, 1999
INVENTOR(S)   : Chadwick et al.

It is certified that error appears in the above-identified patent and that said Letters Patent is hereby corrected as shown below:

<u>Column 7,</u>
Line 46, change "components" to -- component --;

<u>Column 8,</u>
Line 43, change "23" to -- 13 --.

Signed and Sealed this

First Day of April, 2003

JAMES E. ROGAN
*Director of the United States Patent and Trademark Office*